United States Patent
Hattori

(10) Patent No.: US 11,693,142 B2
(45) Date of Patent: Jul. 4, 2023

(54) WATER INTRUSION DETECTOR FOR A TOUCH SENSOR DEVICE

(71) Applicant: AISIN CORPORATION, Aichi (JP)

(72) Inventor: Wataru Hattori, Kariya (JP)

(73) Assignee: AISIN CORPORATION, Kariya (JP)

( * ) Notice: Subject to any disclaimer, the term of this patent is extended or adjusted under 35 U.S.C. 154(b) by 754 days.

(21) Appl. No.: 16/713,089

(22) Filed: Dec. 13, 2019

(65) Prior Publication Data

US 2020/0208456 A1 Jul. 2, 2020

(30) Foreign Application Priority Data

Dec. 26, 2018 (JP) ................. 2018-242339

(51) Int. Cl.
| | | |
|---|---|---|
| *G01V 3/02* | (2006.01) | |
| *E05F 15/48* | (2015.01) | |
| *E05F 15/42* | (2015.01) | |

(52) U.S. Cl.
CPC ............... *G01V 3/02* (2013.01); *E05F 15/48* (2015.01); *E05F 2015/487* (2015.01); *E05Y 2400/44* (2013.01); *E05Y 2900/531* (2013.01)

(58) Field of Classification Search
CPC .. G01V 3/02; E05F 15/42; E05F 15/44; E05F 2015/487
See application file for complete search history.

(56) References Cited

U.S. PATENT DOCUMENTS

| 4,780,663 | A | * | 10/1988 | Mulder | ................ | G01F 23/263 |
| | | | | | | 73/304 R |
| 6,339,305 | B1 | * | 1/2002 | Ishihara | ................ | E05F 15/44 |
| | | | | | | 49/27 |
| 9,234,979 | B2 | | 1/2016 | Bolbocianu et al. | | |
| 9,441,408 | B2 | | 9/2016 | Matsumoto et al. | | |
| 2003/0106377 | A1 | * | 6/2003 | Ishihara | ................ | E05F 15/44 |
| | | | | | | 73/756 |
| 2007/0022819 | A1 | * | 2/2007 | Takeuchi | ................ | E05F 15/42 |
| | | | | | | 73/756 |

(Continued)

FOREIGN PATENT DOCUMENTS

| JP | 2008-261718 A | 10/2008 |
| JP | 2015-174633 A | 10/2015 |

OTHER PUBLICATIONS

Office Action dated Jan. 31, 2023 in Chinese Patent Application No. 201911276256.4, citing document 1 therein.

*Primary Examiner* — Gregory J Strimbu
(74) *Attorney, Agent, or Firm* — Oblon, McClelland, Maier & Neustadt, L.L.P.

(57) ABSTRACT

A touch sensor device includes a touch sensor unit having a sealed, tubular hollow member constituted by an elastically deformable insulator and first and second electrodes extending in a longitudinal direction of the hollow member and apart from each other in which the touch sensor unit is configured such that the first electrode and the second electrode are in contact with each other and electrically connected based on elastic deformation of the hollow member, and a water intrusion detection section is provided at a position located at a lower end portion of the touch sensor unit extending in a vertical direction and, in a case where water has intruded into the hollow member, the first electrode and the second electrode are electrically connected via the intruding water in the water intrusion detection section.

9 Claims, 5 Drawing Sheets

(56) References Cited

U.S. PATENT DOCUMENTS

| | | | |
|---|---|---|---|
| 2009/0146827 A1* | 6/2009 | Wuerstlein | E05F 15/46 340/657 |
| 2013/0333488 A1* | 12/2013 | Ishihara | E05F 15/44 73/862.621 |
| 2015/0369941 A1* | 12/2015 | Pribisic | E05F 15/44 324/658 |
| 2018/0283058 A1 | 10/2018 | Orihara et al. | |

* cited by examiner

WATER INTRUSION DETECTOR FOR A TOUCH SENSOR DEVICE

CROSS REFERENCE TO RELATED APPLICATIONS

This application is based on and claims priority under 35 U.S.C. § 119 to Japanese Patent Application 2018-242339, filed on Dec. 26, 2018, the entire contents of which are incorporated herein by reference.

TECHNICAL FIELD

This disclosure relates to a touch sensor device.

BACKGROUND DISCUSSION

In general, a vehicle door is provided with a touch sensor for detecting the pinching by the door. For example, the touch sensor device described in JP 2015-174633A (Reference 1) is provided with a touch sensor unit that has a tubular hollow member and first and second electrodes extending in the direction of extension of the hollow member in a state of being sealed apart from each other on the inner side of the hollow member. An elastically deformable insulator constitutes the hollow member. Further, the touch sensor unit is configured such that the first electrode and the second electrode disposed in the hollow member are in contact with each other and electrically connected by the hollow member being elastically deformed. As a result, it is possible to detect the pinching by the door provided with the touch sensor unit by detecting external force applied to the touch sensor unit.

In the touch sensor device according to the related art, each of the first electrode and the second electrode is a core wire embedded in an elastically deformable electrical connection member. As a result, the first electrode and the second electrode are configured to be elastically deformed integrally with the hollow member.

However, in the case of the touch sensor unit described above, water may intrude into the hollow member by the outer wall of the hollow member being damaged due to contact with luggage or the like. As a result, it may be impossible to correctly detect the electrical connection of the first electrode and the second electrode based on the elastic deformation of the hollow member (examples of which include insulating film formation on the electrical connection member that constitutes each electrode) and there is still room for improvement in this respect.

Thus, a need exists for a touch sensor device which is not susceptible to the drawback mentioned above.

SUMMARY

A touch sensor device according to an aspect of this disclosure includes a touch sensor unit having a tubular hollow member constituted by an elastically deformable insulator and first and second electrodes extending in a longitudinal direction of the hollow member and apart from each other in a state of being sealed on an inner side of the hollow member. The touch sensor unit is configured such that the first electrode and the second electrode are in contact with each other and electrically connected based on elastic deformation of the hollow member. A water intrusion detection section is provided at a position located at a lower end portion of the touch sensor unit extending in a vertical direction and, in a case where water has intruded into the hollow member, the first electrode and the second electrode are electrically connected via the intruding water in the water intrusion detection section.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
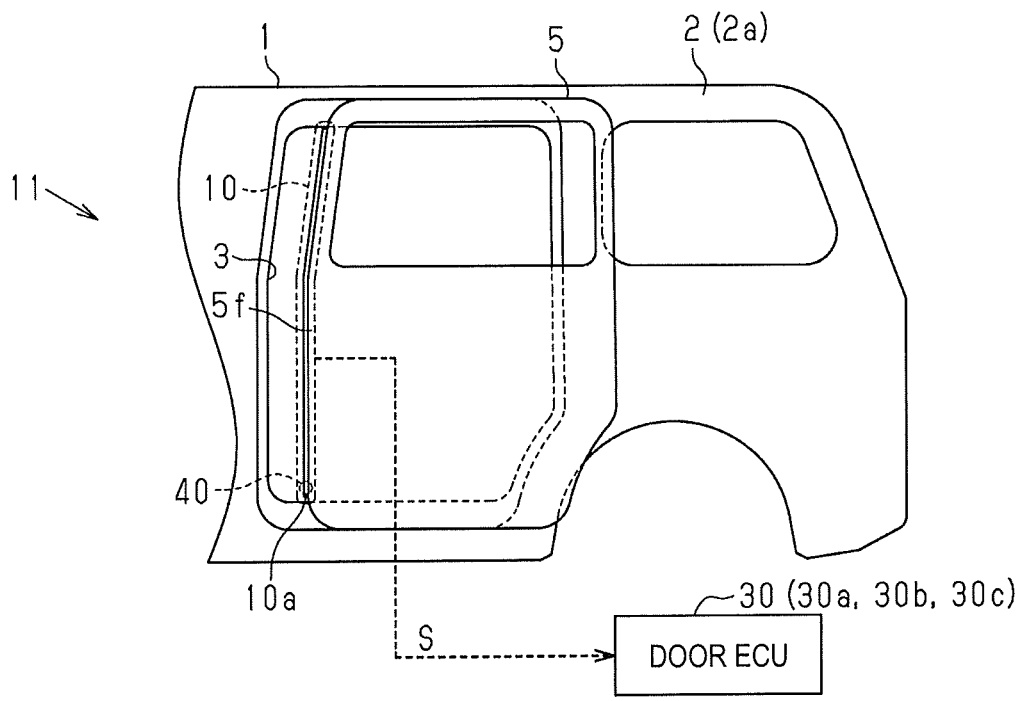
FIG. 1 is a schematic configuration diagram of a touch sensor device.

Hereinafter, a first embodiment in which a vehicular touch sensor device is embodied will be described with reference to the drawings. As illustrated in FIG. 1, a vehicle 1 of the present embodiment is provided with a slide door 5 opening and closing a door opening portion 3 provided on a side surface 2a of a vehicle body 2. In the vehicle 1 of the present embodiment, the slide door 5 has a configuration as a so-called rear opening-type rear door. In other words, the slide door 5 is opened by moving to the rear side of the vehicle (right side in FIG. 1) and is closed by moving to the front side of the vehicle (left side in FIG. 1). Further, the slide door 5 is provided with a touch sensor unit 10 extending in the vertical direction along a front edge portion 5f of the slide door 5. The vehicle 1 of the present embodiment is provided with a touch sensor device 11 detecting the pinching by the slide door 5 based on an output signal S of the touch sensor unit 10.

Figure 2:
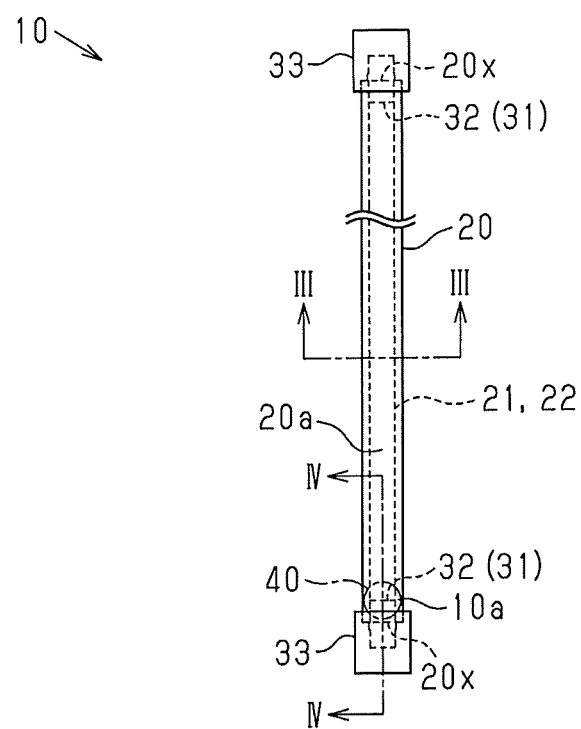
FIG. 2 is a front view of a touch sensor unit.
Figure 3:
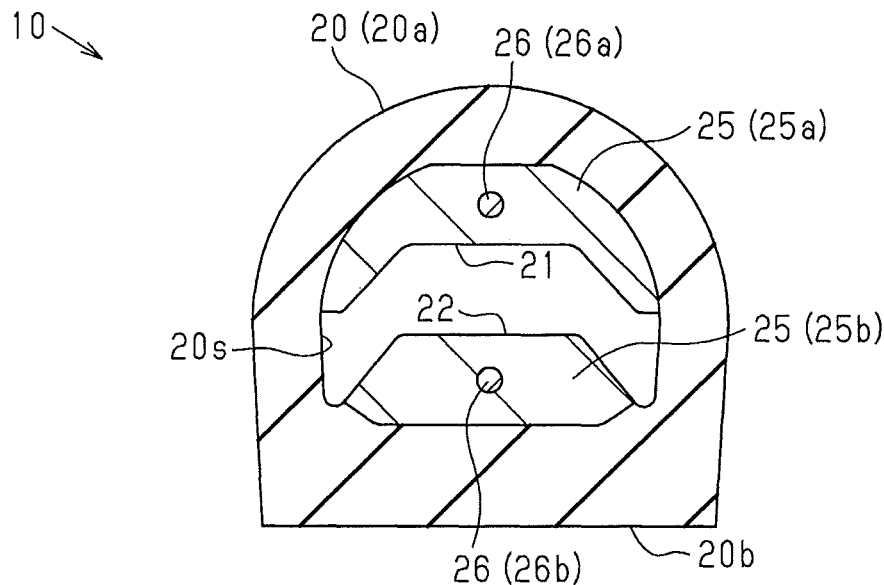
FIG. 3 is a cross-sectional view of the touch sensor unit (III-Ill cross section in FIG. 2)
Figure 4:
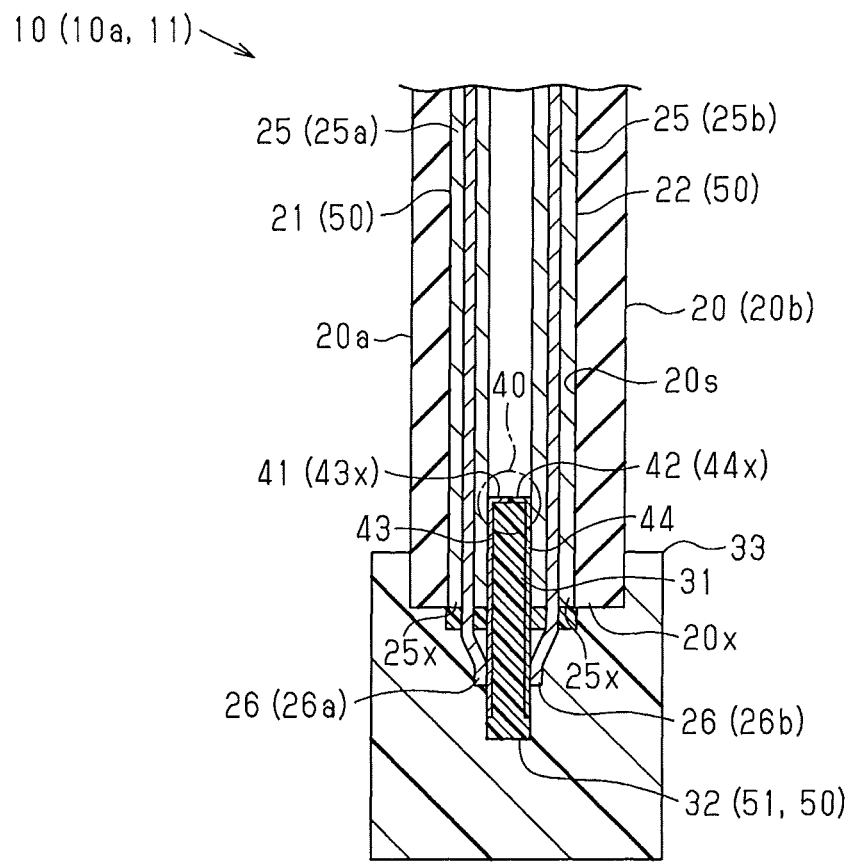
FIG. 4 is a cross-sectional view of the touch sensor unit (IV-IV cross section in FIG. 2)

Specifically, as illustrated in FIGS. 2 to 4, the touch sensor unit 10 of the present embodiment is provided with a tubular hollow member 20 and a first electrode 21 and a second electrode 22 disposed on the inner side of the hollow member. An elastically deformable insulator constitutes the hollow member 20. In the touch sensor unit 10 of the present embodiment, the first electrode 21 and the second electrode 22 extend in the longitudinal direction of the hollow member 20 and apart from each other in a state where the first electrode 21 and the second electrode 22 are fixed to an inner wall surface 20s of the hollow member 20. In addition, the first electrode 21 and the second electrode 22 are formed by a metallic core wire 26 (26a, 26b) being embedded into an elastically deformable electrical connection member 25 (25a, 25b), respectively. As a result, the touch sensor unit 10 of the present embodiment is configured such that the first electrode 21 and the second electrode 22 are elastically deformed integrally with the hollow member 20.

More specifically, the hollow member 20 of the present embodiment has a curved surface 20a, which has a substantially arc-shaped cross section, on the side where the first electrode 21 is disposed (upper side surface in FIG. 3). Further, the hollow member is fixed to the front edge portion 5f of the slide door 5 with the side surface that faces the side opposite to the curved surface 20a (lower side in FIG. 3) used as a fixed surface 20b. As a result, the touch sensor unit 10 of the present embodiment has a configuration in which the hollow member 20 is elastically deformed in such a manner that the substantially arc-shaped cross section of the curved surface 20a is crushed in a case where the slide door 5 pinches a foreign object (such as an occupant's hand or foot, or luggage).

Further, the touch sensor unit 10 of the present embodiment is configured such that the first electrode 21 and the second electrode 22 disposed on the inner side of the hollow member 20 are in contact with each other and electrically connected based on the elastic deformation of the hollow member 20. The touch sensor unit 10 of the present embodiment is configured to perform sensor output in accordance with the electrical connection state of the first electrode 21 and the second electrode 22.

In addition, as illustrated in FIG. 1, the output signal S of the touch sensor unit 10 is input to a door ECU 30 in the vehicle 1 of the present embodiment. As a result, the touch sensor device 11 of the present embodiment is configured such that an electrical connection determination on the first electrode 21 and the second electrode 22 based on the output signal S and a pinching detection by the slide door 5 based on the detection of the electrical connection state are performed in the door ECU 30.

More specifically, as illustrated in FIGS. 2 and 4, the touch sensor unit 10 of the present embodiment is provided with a spacer 32 having an inserting piece 31 intervening between the first electrode 21 and the second electrode 22 and fitting into an opening end 20x of the hollow member 20. In addition, the touch sensor unit 10 has a cover member 33 covering the opening end 20x of the hollow member 20 in which the spacer 32 is fitted from the outer side. As a result, the touch sensor unit 10 of the present embodiment has a configuration in which the first electrode 21 and the second electrode 22 are sealed on the inner side of the hollow member 20 extending in a tubular shape.

In the touch sensor unit 10 of the present embodiment, insulating rubber or the like is used as the elastically deformable insulator that is the material of the hollow member 20. In addition, a carbon-added rubber material such as a carbon-added elastomer and a carbon-added EPDM is used as an example regarding the elastically deformable electrical connection member 25 constituting the first electrode 21 and the second electrode 22. Further, a resin having a high resistance value or the like is used for the material of the spacer 32. The cover member 33 covering the outer side of the spacer 32 is configured to be formed by means of resin and by insert molding in which the spacer 32 and the opening end 20x of the hollow member 20 are insertion bodies.

(Water Intrusion Detection Structure) Next, the water intrusion detection structure that is provided in the touch sensor unit 10 of the present embodiment will be described.

As illustrated in FIGS. 1 and 2, the touch sensor device 11 of the present embodiment is configured such that the touch sensor unit 10 is attached to the front edge portion 5f of the slide door 5 in a state where one longitudinal end portion is directed downward (to the lower side in each of the drawings). As a result, the touch sensor unit 10 of the present embodiment is provided with a water intrusion detection section 40, which is for detecting water intrusion into the hollow member 20, in a lower end portion 10a of the touch sensor unit 10 extending in the vertical direction. The first electrode 21 and the second electrode 22 are disposed on the inner side of the hollow member 20.

Figure 5:
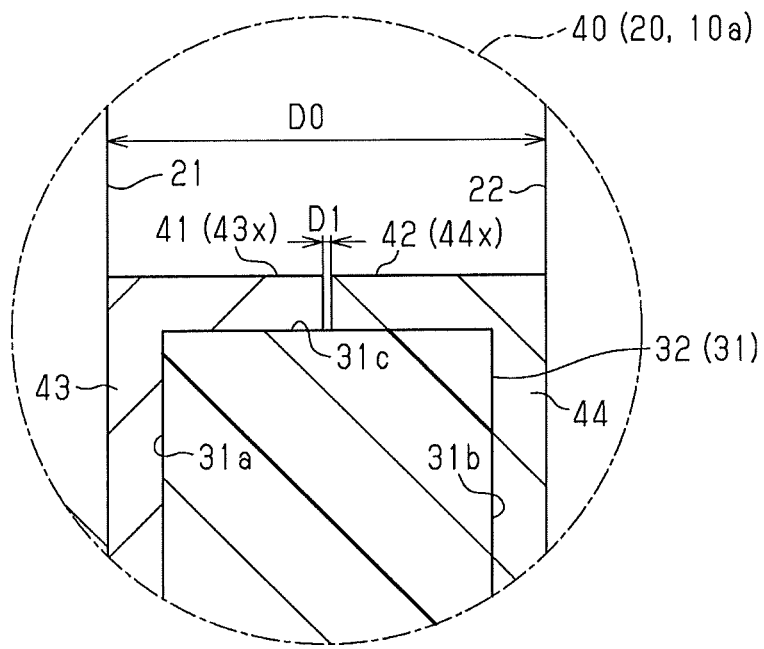
FIG. 5 is an enlarged cross-sectional view of a water intrusion detection section provided in a lower end portion of the touch sensor unit.

Specifically, as illustrated in FIGS. 4 and 5, the touch sensor unit 10 of the present embodiment that is in a state of attachment to the slide door 5 has a first water intrusion detection electrode 41 and a second water intrusion detection electrode 42 in the hollow member 20 disposed at the position that is located at the lower end portion 10a of the touch sensor unit 10. The first water intrusion detection electrode 41 and the second water intrusion detection electrode 42 are disposed with an interval D1, which is narrower than an interval D0 between the first electrode 21 and the second electrode 22. In the touch sensor unit 10 of the present embodiment, the "narrow interval D1" is set to, for example, approximately 0.1 mm. Further, the first water intrusion detection electrode 41 and the second water intrusion detection electrode 42 are connected to the first electrode 21 corresponding to the first water intrusion detection electrode 41 and the second electrode 22 corresponding to the second water intrusion detection electrode 42, respectively. The touch sensor unit 10 of the present embodiment has a configuration in which the first water intrusion detection electrode 41 extending from the first electrode 21 and the second water intrusion detection electrode 42 extending from the second electrode 22 function as the water intrusion detection section 40.

In other words, in a case where water intrusion has occurred on the inner side of the hollow member 20, the intruding water moves to the lower end portion 10a of the touch sensor unit 10. Further, the intruding water moves to a position straddling the first water intrusion detection electrode 41 and the second water intrusion detection electrode 42, that is, a position interconnecting the first water intrusion detection electrode 41 and the second water intrusion detection electrode 42. As a result, the first electrode 21 to which the first water intrusion detection electrode 41 is connected and the second electrode 22 to which the second water intrusion detection electrode 42 is connected are electrically connected via the water. The touch sensor device 11 of the present embodiment is capable of quickly detecting water intrusion into the hollow member 20 by using the above.

More specifically, the touch sensor unit 10 of the present embodiment is provided with a pair of electrical connection members 43 and 44, which are fixed to the inserting piece 31 of the spacer 32 fitting into the opening end 20x of the hollow member 20, in the lower end portion 10a of the touch sensor unit 10.

In the touch sensor unit 10 of the present embodiment, each of the electrical connection members 43 and 44 has a substantially flat plate-shaped outer shape. The electrical connection members 43 and 44 are respectively fixed to two opposite side surfaces of the inserting piece 31 of the spacer 32 extending in a substantially prismatic shape along the insertion direction with respect to the hollow member 20.

Specifically, as illustrated in FIG. 5, the electrical connection members 43 and 44 are respectively fixed to a first side surface 31a of the inserting piece 31 disposed on the first electrode 21 side and a second side surface 31b of the inserting piece 31 positioned on the second electrode 22 side in a state of extending in the longitudinal direction of the inserting piece 31 (vertical direction in FIG. 5). In addition, each of the electrical connection members 43 and 44 extends to a tip end surface 31c of the inserting piece 31. As a result, distal end portions 43x and 44x of the electrical connection members 43 and 44 are disposed at positions facing the inner side of the hollow member 20. The electrical connection members 43 and 44 are respectively shaped so as to be bent substantially at right angles toward each other such that the distal end portions 43x and 44x facing the inner side of the hollow member 20 are along the tip end surface 31c of the inserting piece 31.

In addition, as illustrated in FIG. 4, the core wire 26a of the first electrode 21 drawn out from a terminal 25x of the electrical connection member 25a is connected to the electrical connection member 43, which is one of the electrical connection members 43 and 44. Likewise, the core wire 26b of the second electrode 22 drawn out from the terminal 25x of the electrical connection member 25b is connected to the other electrical connection member 44. As a result, the touch sensor unit 10 of the present embodiment is configured such that the electrical connection members 43 and 44 function as the first water intrusion detection electrode 41 and the second water intrusion detection electrode 42, respectively.

In the touch sensor unit 10 of the present embodiment, each of the electrical connection members 43 and 44 is embedded in the spacer 32 by insert molding in a state of being exposed to the first side surface 31a, the second side surface 31b, and the tip end surface 31c of the inserting piece 31. As a result, the touch sensor unit 10 of the present embodiment has a configuration in which the interval D1 between the distal end portion 43x of the electrical connection member 43 constituting the first water intrusion detection electrode 41 and the distal end portion 44x of the electrical connection member 44 constituting the second water intrusion detection electrode 42 is kept constant on the tip end surface 31c of the inserting piece 31 disposed on the inner side of the hollow member 20.

In addition, as illustrated in FIG. 1, in the touch sensor device 11 of the present embodiment, the door ECU 30 executes a water intrusion determination with respect to the hollow member 20 (water intrusion determination) based on the electrical connection state of the first electrode 21 and the second electrode 22 indicated by the output signal S of the touch sensor unit 10.

Specifically, the door ECU 30 as an electrical connection determination unit 30a detects a resistance value R of a detection circuit 50 including the first electrode 21 and the second electrode 22. As illustrated in FIGS. 4 and 5, in the touch sensor unit 10 of the present embodiment, the electrical connection members 43 and 44 are fixed to the two opposite side surfaces (31a and 31b) as described above. As a result, (the inserting piece 31 of) the spacer 32 sandwiched between the electrical connection members 43 and 44 functions as a resistor 51 connected to the first electrode 21 and the second electrode 22. The door ECU 30 as a pinching detection unit 30b and a water intrusion determination unit 30c is configured to execute the pinching detection and the water intrusion determination based on a change in the resistance value R.

In other words, in a case where the first electrode 21 and the second electrode 22 are not in contact with each other and no water intrusion has occurred on the inner side of the hollow member 20, the resistance value R as a high value corresponding to the resistor 51 connected to the first electrode 21 and the second electrode 22 is detected based on the output signal S of the touch sensor unit 10. In a case where the resistance value R of the detection circuit 50 is high, the door ECU 30 of the present embodiment determines that the first electrode 21 and the second electrode 22 are in a non-electrical connection state.

In addition, in a case where the first electrode 21 and the second electrode 22 are in contact with each other and electrically connected and in a case where the water that has intruded into the hollow member 20 causes the first electrode 21 and the second electrode 22 to be electrically connected in the water intrusion detection section 40 configured as described above, the resistance value R as a value lower than in the non-electrical connection state is detected based on the output signal S of the touch sensor unit 10.

However, water has a relatively large resistance value, and thus the detected resistance value R is higher in a case where the first electrode 21 and the second electrode 22 are electrically connected by the water that has intruded into the hollow member 20 moving to the water intrusion detection section 40 than in a case where the first electrode 21 and the second electrode 22 are electrically connected as a result of mutual contact. As a result, the door ECU 30 of the present embodiment is configured to discriminate between a case where pinching has occurred by the slide door 5 and a case where water intrusion has occurred with respect to the hollow member 20.

Figure 6:
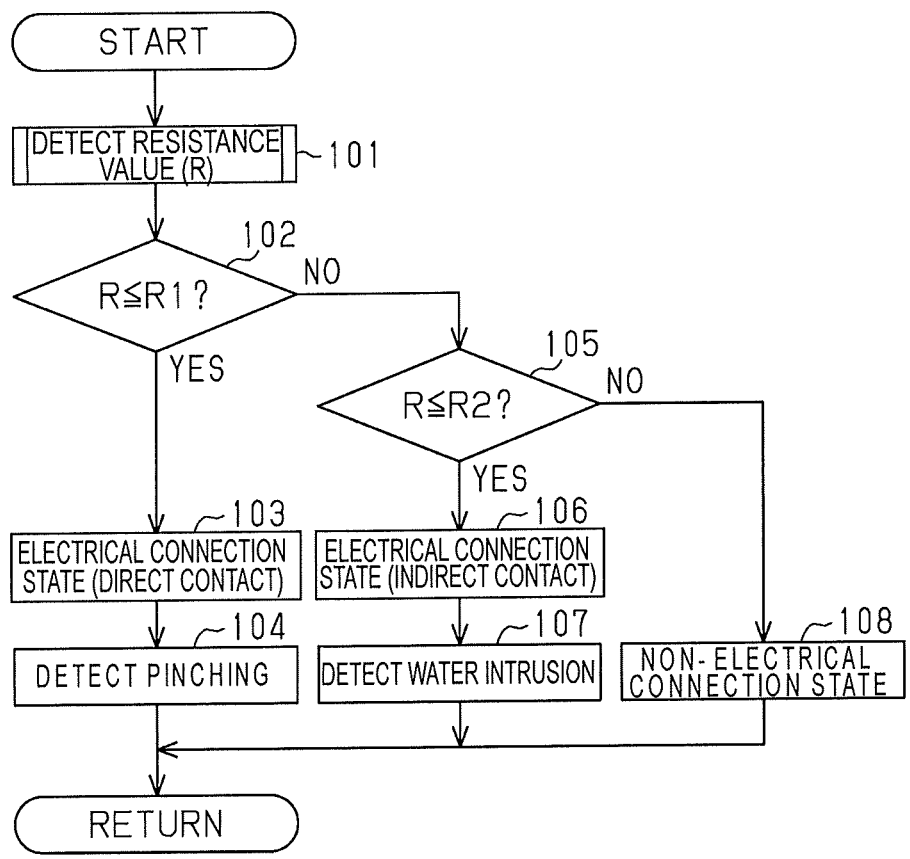
FIG. 6 is a flowchart illustrating the processing procedures of an electrical connection state determination, a pinching detection, and a water intrusion determination.

Specifically, as illustrated in the flowchart of FIG. 6, the door ECU 30 of the present embodiment first compares the resistance value R with a first electrical connection determination value R1 (Step 102) once the door ECU 30 detects the resistance value R of the detection circuit 50 including the first electrode 21 and the second electrode 22 based on the output signal S of the touch sensor unit 10 (Step 101). In a case where the resistance value R is equal to or less than the first electrical connection determination value R1 (R≤R1, Step 102: YES), the door ECU 30 determines that the first electrode 21 and the second electrode 22 constituting the touch sensor unit 10 are in the electrical connection state (Step 103).

Further, in Step 103, the door ECU 30 of the present embodiment determines that the electrical connection state has resulted from contact between the first electrode 21 and the second electrode 22 (direct contact). In the touch sensor unit 10 of the present embodiment, it is determined that pinching has occurred by the slide door 5 provided with the touch sensor unit 10 based on the fact that the direct contact occurs in a case where the hollow member 20 that has the inner side on which the first electrode 21 and the second electrode 22 are disposed is elastically deformed (pinching detection, Step 104).

In addition, in a case where the detected resistance value R of the detection circuit 50 is higher than the first electrical connection determination value R1 in Step 102 (R>R1, Step 102: NO), the door ECU 30 of the present embodiment compares the resistance value R with a second electrical connection determination value R2 set to a value higher than the first electrical connection determination value R1 (Step 105). Even in a case where the resistance value R is equal to or less than the second electrical connection determination value R2 (R≤R2, Step 104: YES), the door ECU 30 determines that the first electrode 21 and the second electrode 22 constituting the touch sensor unit 10 are in the electrical connection state (Step 106).

Further, in Step 106, the door ECU 30 of the present embodiment determines that the electrical connection state is attributable to the presence of water in the water intrusion detection section 40 provided in the lower end portion 10*a* of the touch sensor unit 10 as described above (indirect contact). As a result, the door ECU 30 is configured to determine that water intrusion has occurred on the inner side of the hollow member 20 (water intrusion detection, Step 107).

The door ECU 30 of the present embodiment is configured to determine that the first electrode 21 and the second electrode 22 constituting the touch sensor unit 10 are in the non-electrical connection state (Step 108) in a case where the detected resistance value R of the detection circuit 50 is higher than the second electrical connection determination value R2 in Step 105 (R>R2, Step 105: NO).

Next, the effects of the present embodiment will be described.

(1) The touch sensor device 11 is provided with the touch sensor unit 10 that has the tubular hollow member 20 constituted by the elastically deformable insulator and the first electrode 21 and the second electrode 22 extending in the longitudinal direction of the hollow member 20 in a state of being sealed on the inner side of the hollow member 20 apart from each other. In addition, the touch sensor unit 10 is configured such that the first electrode 21 and the second electrode 22 are in contact with each other and electrically connected based on the elastic deformation of the hollow member 20. The water intrusion detection section 40 is provided at the position that is located at the lower end portion 10*a* of the touch sensor unit 10 by the touch sensor unit 10 extending in the vertical direction. In the water intrusion detection section 40, the first electrode 21 and the second electrode 22 are electrically connected via the intruding water in a case where water intrusion has occurred on the inner side of the hollow member 20.

In other words, the water that has intruded into the hollow member 20 extending in the vertical direction moves to the lower end portion 10*a*. Accordingly, with the configuration described above, it is possible to quickly detect water intrusion into the hollow member 20 based on the electrical connection state of the first electrode 21 and the second electrode 22. Erroneous detection can be forestalled by the disposition in the lower end portion 10*a*, where the amount of elastic deformation of the hollow member 20 attributable to external force application is relatively small.

(2) The water intrusion detection section 40 is formed by the first water intrusion detection electrode 41 and the second water intrusion detection electrode 42 being disposed at the position that is located at the lower end portion 10*a* of the touch sensor unit 10. The first water intrusion detection electrode 41 extends from the first electrode 21, the second water intrusion detection electrode 42 extends from the second electrode 22, and the interval D1 between the first water intrusion detection electrode 41 and the second water intrusion detection electrode 42 is narrower than the interval D0 between the first electrode 21 and the second electrode 22.

In other words, water has a relatively large resistance value. However, with the configuration described above, the first electrode 21 and the second electrode 22 can be configured to be electrically connected via the water that has intruded into the hollow member 20 by means of a simple configuration. Further, there is an advantage that the first water intrusion detection electrode 41 and the second water intrusion detection electrode 42 can be interconnected with a smaller amount of water. As a result, it is possible to quickly detect water intrusion into the hollow member 20.

(3) The touch sensor unit 10 is provided with the spacer 32 having the inserting piece 31 intervening between the first electrode 21 and the second electrode 22 and fitting into the opening end 20*x* of the hollow member 20. The first water intrusion detection electrode 41 and the second water intrusion detection electrode 42 are formed by the pair of electrical connection members 43 and 44 that face the inner side of the hollow member 20 being fixed to the spacer 32.

With the configuration described above, it is possible to form the water intrusion detection section 40 at the position that is located at the lower end portion 10*a* of the touch sensor unit 10 by means of a simple configuration. The first water intrusion detection electrode 41 and the second water intrusion detection electrode 42 formed by the pair of electrical connection members 43 and 44 can be stably held with the interval D1, which is narrower than the interval D0 between the first electrode 21 and the second electrode 22.

(4) The touch sensor device 11 is provided with the door ECU 30 as the electrical connection determination unit 30*a* determining the electrical connection state of the first electrode 21 and the second electrode 22 based on the output signal S of the touch sensor unit 10 and the water intrusion determination unit 30*c* determining water intrusion into the hollow member 20 based on the electrical connection state. The door ECU 30 detects the resistance value R of the detection circuit 50 including the first electrode 21 and the second electrode 22 as the electrical connection state of the first electrode 21 and the second electrode 22. The door ECU 30 determines that water intrusion has occurred on the inner side of the hollow member 20 in a case where the resistance value R that is higher than the first electrical connection determination value R1, which pertains to a case where the first electrode 21 and the second electrode 22 are in contact with each other and electrically connected, is detected and the resistance value R is equal to or less than the second electrical connection determination value R2 set to a value higher than the first electrical connection determination value R1 (R1<R≤R2). As a result, it is possible to detect water intrusion into the hollow member 20 with high accuracy and by means of a simple configuration.

The embodiment described above can be implemented with the following modifications. The embodiment described above and the following modification examples can be implemented in combination with each other within a technically consistent scope.

Although the touch sensor device 11 embodied in the embodiment described above performs the pinching detection by the slide door 5 by means of the touch sensor unit 10 provided in the front edge portion 5*f* of the slide door 5, application may also be carried out to a configuration in which a vehicle back door is provided with the touch sensor unit 10.

In the embodiment described above, the electrical connection members 43 and 44 respectively form the first water intrusion detection electrode 41 and the second water intrusion detection electrode 42 by being fixed to the inserting piece 31 of the spacer 32 and the electrical connection members 43 and 44 are respectively shaped so as to be bent substantially at right angles toward each other such that the distal end portions 43*x* and 44*x* facing the inner side of the hollow member 20 are along the tip end surface 31*c* of the inserting piece 31.

Figure 7:
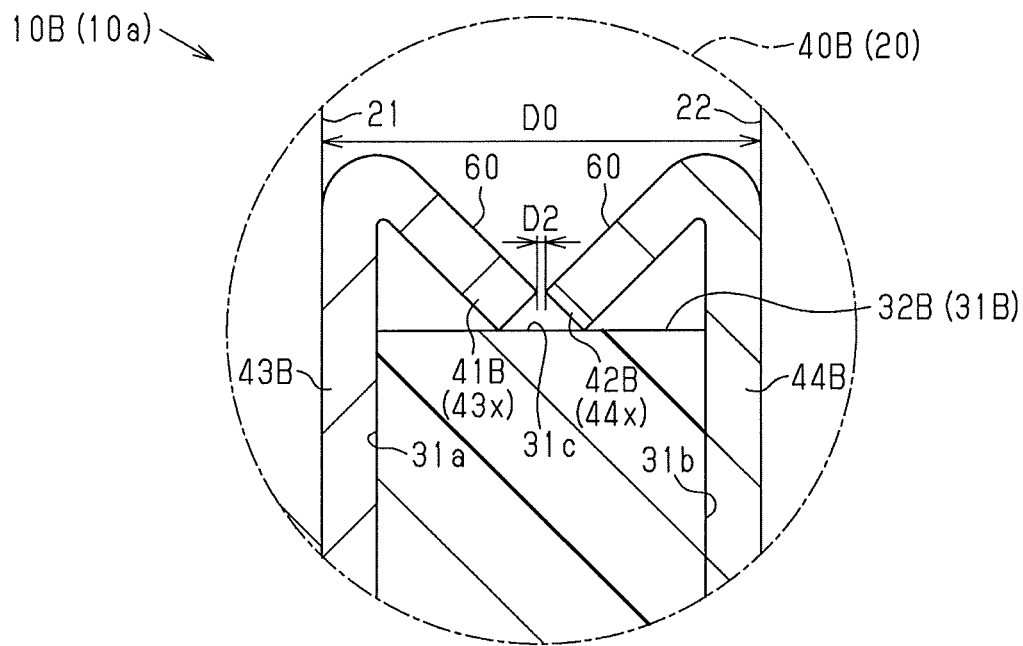
FIG. 7 is an enlarged cross-sectional view of the touch sensor unit illustrating a water intrusion detection section of another example.

However, the embodiments disclosed here is not limited thereto. In the case of a touch sensor unit 10B illustrated in FIG. 7, electrical connection members 43B and 44B respectively form a first water intrusion detection electrode 41B and a second water intrusion detection electrode 42B of a water intrusion detection section 40B by being fixed to a spacer 32B and each of the electrical connection members 43B and 44B extends to the inner side of the hollow member 20 (upper side in FIG. 7) beyond the tip end surface 31c of an inserting piece 31B. Further, each of the electrical connection members 43B and 44B is folded back from a position in the hollow member 20 that is inside the tip end surface 31c of the inserting piece 31B, that is, from an upper position. As a result, the distal end portions 43x and 44x are shaped so as to be folded back toward the tip end surface 31c of the inserting piece 31B. In one configuration, each of the respective distal end portions 43x and 44x of the electrical connection members 43B and 44B disposed so as to face each other with an interval D2, which is narrower than the interval D0 between the first electrode 21 and the second electrode 22, as a result may form a slope 60 guiding the water that has intruded into the hollow member 20 to the interval between both, that is, a position straddling the first water intrusion detection electrode 41B and the second water intrusion detection electrode 42B.

By the configuration being adopted, the water that has moved to the water intrusion detection section 40B more smoothly interconnects the first water intrusion detection electrode 41B and the second water intrusion detection electrode 42B. As a result, the first electrode 21 and the second electrode 22 are electrically connected via the water, and thus water intrusion into the hollow member 20 can be detected more quickly.

In another configuration, the slope 60 may be formed by either the first water intrusion detection electrode 41B or the second water intrusion detection electrode 42B. In another configuration, the tip end surface 31c of the inserting piece 31B, where the distal end portions 43x and 44x of the electrical connection members 43B and 44B respectively becoming the first water intrusion detection electrode 41 and the second water intrusion detection electrode 42 of the water intrusion detection section 40 are disposed, may have a bowl shape or a slope shape.

Further, in another configuration, fine irregularities having a water repellent function may be formed on the slope 60 formed by the first water intrusion detection electrode 41B and the second water intrusion detection electrode 42B (so-called lotus effect). As a result, the water that has moved to the water intrusion detection section 40B can be more smoothly guided to the position straddling the first water intrusion detection electrode 41B and the second water intrusion detection electrode 42B. As a result, water intrusion into the hollow member 20 can be detected more quickly.

In the embodiment described above, each of the electrical connection members 43 and 44 has a substantially flat plate-shaped outer shape. Each of the electrical connection members 43 and 44 is fixed to the inserting piece 31 of the spacer 32 by being embedded by insert molding. However, the embodiment disclosed here is not limited thereto. Each of the electrical connection members 43 and 44 may have any shape, examples of which include a thin film shape and a line shape. Further, the fixing structure with respect to the spacer 32 may be any fixing structure, examples of which include adhesion and fitting. For example, the metal film that is formed on the surface of the spacer 32 by plating the spacer 32 may be used for the electrical connection members 43 and 44.

Figure 8:
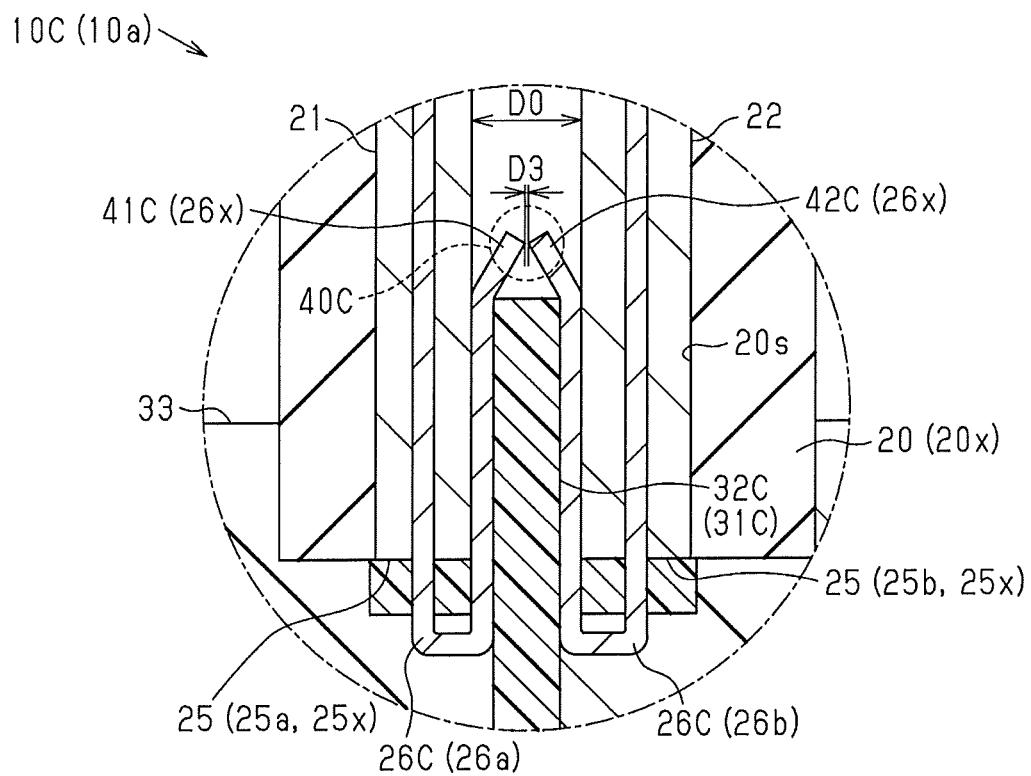
FIG. 8 is an enlarged cross-sectional view of the touch sensor unit illustrating a water intrusion detection section of another example.

In addition, a first water intrusion detection electrode 41C and a second water intrusion detection electrode 42C of a water intrusion detection section 40C may be formed by respective core wires 26C (26a, 26b) of the first electrode 21 and the second electrode 22 being caused to project to the inner side of the hollow member 20 as in the case of a touch sensor unit 100 illustrated in FIG. 8.

Specifically, in the touch sensor unit 100 exemplified in FIG. 8, the respective core wires 26C (26a, 26b) of the first electrode 21 and the second electrode 22 drawn out from the terminal 25x of the electrical connection member 25 (25a, 25b) respectively extend to the inner side of the hollow member 20 so as to be along an inserting piece 31C of a spacer 32C fitting into the opening end 20x of the hollow member 20. Further, a tip end 26x of each of the core wires 26C (26a, 26b) extends to the inner side of the hollow member 20 (upper side in FIG. 7) beyond the tip end surface 31c of the inserting piece 31C. In addition, the core wires 26C (26a, 26b) are bent such that the tip ends 26x approach each other. As a result, the touch sensor unit 10C has a configuration in which the respective tip ends 26x of the core wires 26C (26a, 26b) disposed so as to face each other with an interval D3, which is narrower than the interval D0 between the first electrode 21 and the second electrode 22, form the first water intrusion detection electrode 41C and the second water intrusion detection electrode 42C.

Effects similar to the effects of the embodiment described above can be obtained even when such a configuration is adopted. In addition, the number of components can be reduced. In addition, in the example illustrated in FIG. 8, each of the core wires 26C (26a, 26b) extending to the inner side of the hollow member 20 via the opening end 20x of the hollow member 20 has a fixed position in a state of being sandwiched between the peripheral surfaces of (the inserting piece 31C of) the spacer 32C fitted in the opening end 20x. As a result, the tip ends 26x of the core wires 26C (26a, 26b) respectively becoming the first water intrusion detection electrode 41C and the second water intrusion detection electrode 42C of the water intrusion detection section 40C can be stably held with the interval D2, which is narrower than the interval D0 between the first electrode 21 and the second electrode 22, by means of a simple configuration.

Also in this case, the tip ends 26x of the core wires 26C (26a, 26b) respectively becoming the first water intrusion detection electrode 41C and the second water intrusion detection electrode 42C may have any shape. For example, the shape may be a plate shape in part. The first water intrusion detection electrode 41C and the second water intrusion detection electrode 42C formed as a result may form the slope 60 (see FIG. 7).

In addition, the respective parts of the core wires 26C (26a, 26b) that extend to the inner side of the hollow member 20 may be the electrical connection members 43 and 44 and the parts may be fixed to the spacer 32C.

Further, at least one of the respective core wires 26 (26a, 26b) of the first electrode 21 and the second electrode 22 may project to the inner side of the hollow member 20 in such a manner that the electrical connection member 25 (25a, 25b) is pierced in the radial direction. Effects similar to the effects of the embodiment described above can be obtained even when such a configuration is adopted.

In addition, although the first water intrusion detection electrode 41 extending from the first electrode 21 and the second water intrusion detection electrode 42 extending from the second electrode 22 are formed by being disposed with the interval D1 narrower than the interval D0 between the first electrode 21 and the second electrode 22 in the embodiment described above, another structure may form the water intrusion detection section 40 in another configuration.

Figure 9:
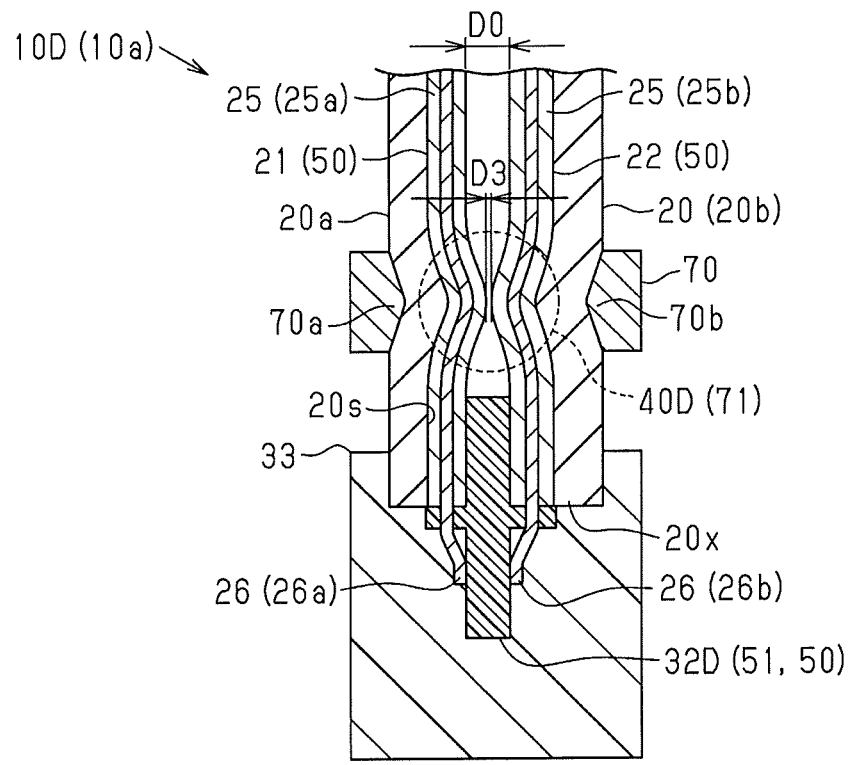
FIG. 9 is a cross-sectional view of the touch sensor unit illustrating a water intrusion detection section of another example.

For example, a touch sensor unit 10D illustrated in FIG. 9 is provided with a pressure member 70 elastically deforming the hollow member 20 in a state of squeezing the hollow member 20 in the radial direction by being fitted to the outer periphery of the hollow member 20. Specifically, the pressure member 70 is provided with a first pressing portion 70a having a substantially wedge-shaped cross-sectional shape and pressing the curved surface 20a on the side where the first electrode 21 is disposed and a second pressing portion 70b having the same and substantially wedge-shaped cross-sectional shape and pressing the fixed surface 20b on the side where the second electrode 22 is disposed. As a result, a water intrusion detection section 40D is formed by a narrow portion 71, where the interval between the first electrode 21 and the second electrode 22 is narrowed, being set (D0 to D3) at the position that is located at the lower end portion 10a of the touch sensor unit 10, specifically, in the vicinity of the opening end 20x of the hollow member 20 where a spacer 32D is fitted.

Effects similar to the effects of the embodiment described above can be obtained even when such a configuration is adopted. The configuration of the pressure member 70 may be changed in any manner in terms of shape, size, and so on. For example, only one of the side where the first electrode 21 is disposed and the side where the second electrode 22 is disposed may be pressed. For example, the narrow portion 71 that becomes the water intrusion detection section 40D may be formed without the pressure member 70 being used, examples of which include at least one of the electrical connection members 25 (25a, 25b) that respectively constitute the first electrode 21 and the second electrode 22 being provided in advance with a bulging portion projecting to the other side of the first electrode 21 and the second electrode 22.

In the embodiment described above, the door ECU 30 as the electrical connection determination unit 30a detects the resistance value R of the detection circuit 50 including the first electrode 21 and the second electrode 22 as the electrical connection state of the first electrode 21 and the second electrode 22. The door ECU 30 as the water intrusion determination unit 30c executes the water intrusion determination with respect to the hollow member 20 based on a change in the detected resistance value R (see FIG. 6). However, the embodiments disclosed here is not limited thereto. In an alternative configuration, the pinching detection by the slide door 5 and the water intrusion determination with respect to the hollow member 20 may be executed by the electrical connection state of the first electrode 21 and the second electrode 22 and the operating state of the slide door 5 being combined with each other.

Figure 10:
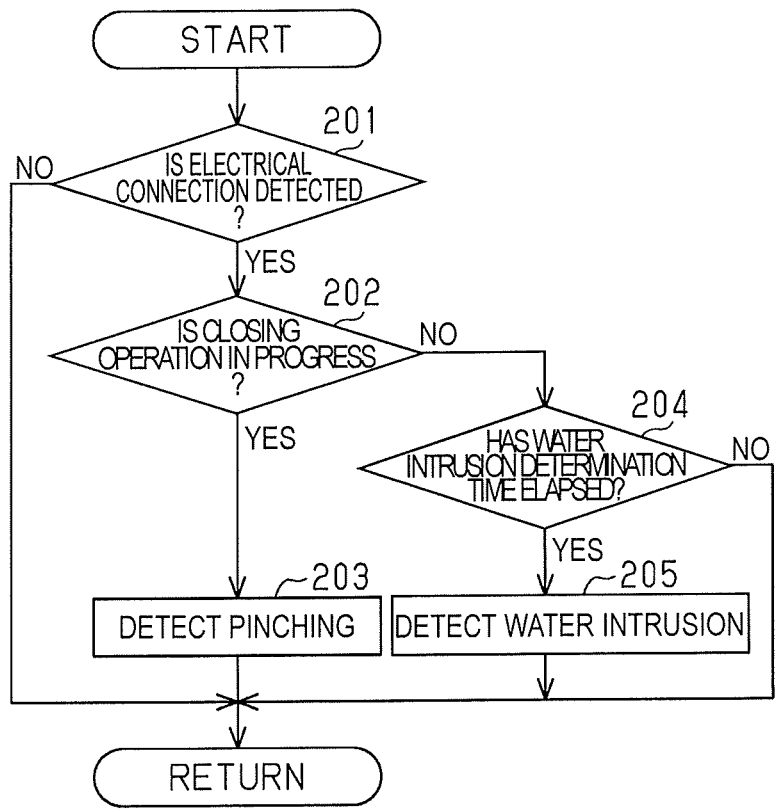
FIG. 10 is a flowchart illustrating the processing procedures of a pinching detection and a water intrusion determination of another example.

For example, as illustrated in the flowchart of FIG. 10, whether the slide door 5 is being closed is first determined (Step 202) in a case where it is detected that the first electrode 21 and the second electrode 22 are in the electrical connection state (Step 201: YES). In a case where the slide door 5 is being closed (Step 202: YES), it is determined that pinching has occurred by the slide door 5 (pinching detection, Step 203).

In a case where the slide door 5 is not being closed in Step 202 (Step 202: NO), which includes a case where the slide door 5 is already fully closed, it is determined whether or not the first electrode 21 and the second electrode 22 are in the electrical connection state beyond a predetermined water intrusion determination time (Step 204). It may be determined that water intrusion has occurred on the inner side of the hollow member 20 (water intrusion detection, Step 205) in a case where the first electrode 21 and the second electrode 22 are in the electrical connection state beyond the water intrusion determination time (Step 204: YES).

Even when the configuration is adopted, it is possible to perform the water intrusion determination with respect to the hollow member 20 with high accuracy and based on the electrical connection state of the first electrode 21 and the second electrode 22 as in the case of the embodiment described above. Further, the electrical connection determination in this case is also established by an ON/OFF determination similar to that of a switch. Calculation load reduction can be achieved as a result.

The operating state of the slide door 5 used for the water intrusion determination may be changed in any manner in accordance with the specifications of the vehicle 1. For example, in a case where the slide door 5 is being opened, the first electrode 21 and the second electrode 22 being electrically connected may be used as a determination condition for the water intrusion detection. In another example regarding a vehicle in which the hollow member 20 is not elastically deformed, the slide door 5 being fully closed may be used as a determination condition for the water intrusion detection in a case where the slide door 5 is fully closed. In other words, being in a situation in which there is a low possibility of the mutual contact and electrical connection of the first electrode 21 and the second electrode 22 resulting from pinching may be used as a determination condition. The water intrusion determination based on the operating state of the slide door 5 and the water intrusion determination based on the resistance change of the detection circuit 50 including the first electrode 21 and the second electrode 22 as in the embodiment described above may be executed in combination with each other.

In the embodiment described above, the spacer 32 sandwiched between the pair of electrical connection members 43 and 44 connected to (the respective core wires 26 of) the first electrode 21 and the second electrode 22 functions as the resistor 51 connected to the first electrode 21 and the second electrode 22. However, the embodiment disclosed here is not limited thereto. In an alternative configuration, the first electrode 21 and the second electrode 22 may be connected to the resistor 51 that is provided independently of the spacer 32.

Next, the technical idea that can be grasped from the embodiment and the modification examples will be described.

A touch sensor device according to an aspect of this disclosure includes a touch sensor unit having a tubular hollow member constituted by an elastically deformable insulator and first and second electrodes extending in a longitudinal direction of the hollow member and apart from each other in a state of being sealed on an inner side of the hollow member. The touch sensor unit is configured such that the first electrode and the second electrode are in contact with each other and electrically connected based on elastic deformation of the hollow member. A water intrusion detection section is provided at a position located at a lower end portion of the touch sensor unit extending in a vertical direction and, in a case where water has intruded into the hollow member, the first electrode and the second electrode are electrically connected via the intruding water in the water intrusion detection section.

That is, the water that has intruded into the hollow member extending in the vertical direction moves to the lower end portion side. Accordingly, with the configuration described above, it is possible to quickly detect water intrusion into the hollow member based on the electrical connection state of the first electrode and the second electrode.

In the touch sensor device according to the aspect of this disclosure, it is preferable that the water intrusion detection section is formed by disposing a first water intrusion detection electrode extending from the first electrode and a second water intrusion detection electrode extending from the second electrode at the position located at the lower end portion of the touch sensor unit and with an interval narrower than an interval between the first electrode and the second electrode.

Water has a relatively large resistance value. However, with the configuration described above, the first electrode and the second electrode can be configured to be electrically connected via the water that has intruded into the hollow member by means of a simple configuration. Further, there is an advantage that the first water intrusion detection electrode and the second water intrusion detection electrode can be interconnected with a smaller amount of water. As a result, it is possible to quickly detect water intrusion into the hollow member.

In the touch sensor device according to the aspect of this disclosure, it is preferable that the touch sensor unit is provided with a spacer having an inserting piece intervening between the first electrode and the second electrode and fitting into an opening end of the hollow member and the first water intrusion detection electrode and the second water intrusion detection electrode are formed by fixing a pair of electrical connection members facing the inner side of the hollow member to the spacer.

With the configuration described above, it is possible to form the water intrusion detection section at the position that is located at the lower end portion of the touch sensor unit by means of a simple configuration. The first water intrusion detection electrode and the second water intrusion detection electrode formed by the pair of electrical connection members can be stably held with the interval narrower than the interval between the first electrode and the second electrode.

In the touch sensor device according to the aspect of this disclosure, it is preferable that each of the first electrode and the second electrode is formed by embedding a core wire into an elastically deformable electrical connection member and each of the first water intrusion detection electrode and the second water intrusion detection electrode is formed in such that the core wire projects to the inner side of the hollow member.

With the configuration described above, it is possible to form the first water intrusion detection electrode and the second water intrusion detection electrode of the water intrusion detection section by means of a simple configuration.

In the touch sensor device according to the aspect of this disclosure, it is preferable that at least one of the first water intrusion detection electrode and the second water intrusion detection electrode forms a slope guiding the water to a position straddling the first water intrusion detection electrode and the second water intrusion detection electrode after a movement of the water to the water intrusion detection section.

With the configuration described above, the water that has moved to the water intrusion detection section more smoothly interconnects the first water intrusion detection electrode and the second water intrusion detection electrode. As a result, the first electrode and the second electrode are electrically connected via the water, and thus water intrusion into the hollow member can be detected more quickly.

In the touch sensor device according to the aspect of this disclosure, it is preferable that the water intrusion detection section is formed by a narrow portion where the interval between the first electrode and the second electrode is narrowed, at the position located at the lower end portion of the touch sensor unit.

With the configuration described above, it is possible to form the water intrusion detection section by means of a simple configuration.

It is preferable that the touch sensor further includes a pressure member elastically deforming the hollow member and forming the narrow portion by being fitted to an outer periphery of the hollow member.

With the configuration described above, it is possible to easily form the narrow portion that becomes the water intrusion detection section.

It is preferable that the touch sensor device further includes an electrical connection determination unit determining an electrical connection state of the first electrode and the second electrode and a water intrusion determination unit determining water intrusion with respect to the hollow member based on the electrical connection state, the electrical connection determination unit detects a resistance value of a detection circuit including the first electrode and the second electrode, and the water intrusion determination unit determines that water intrusion has occurred on the inner side of the hollow member in a case where a resistance value higher than a first electrical connection determination value pertaining to that in a case where the first electrode and the second electrode are in contact with each other and electrically connected is detected and the resistance value is equal to or less than a second electrical connection determination value set to a value higher than the first electrical connection determination value.

With the configuration described above, it is possible to detect water intrusion into the hollow member with high accuracy and by means of a simple configuration.

It is preferable that the touch sensor device further includes an electrical connection determination unit determining an electrical connection state of the first electrode and the second electrode and a water intrusion determination unit determining water intrusion with respect to the hollow member based on the electrical connection state, and the water intrusion determination unit determines that water intrusion has occurred on the inner side of the hollow member in a case where it is determined that the first electrode and the second electrode are in a state of electrical connection beyond a predetermined water intrusion determination time.

With the configuration described above, it is possible to detect water intrusion into the hollow member with high accuracy and by means of a simple configuration.

In the touch sensor device according to the aspect of this disclosure, it is preferable that the spacer sandwiched between the pair of electrical connection members functions as a resistor connected to the first electrode and the second electrode. As a result, the number of components can be reduced.

The touch sensor device according to the aspect of this disclosure, it is preferable that the slope is provided with fine irregularities having a water repellent function. As a result, the water that has moved to the water intrusion detection section can be more smoothly guided to the position straddling the first water intrusion detection electrode and the second water intrusion detection electrode. As a result, water intrusion into the hollow member can be detected more quickly.

A touch sensor device according to another aspect of this disclosure includes a touch sensor unit having a tubular hollow member constituted by an elastically deformable insulator and first and second electrodes extending in a longitudinal direction of the hollow member and apart from each other in a state of being sealed on an inner side of the hollow member, in which the touch sensor unit is configured such that the first electrode and the second electrode are in contact with each other and electrically connected based on elastic deformation of the hollow member, a water intrusion detection section is provided on the inner side of the hollow member, the water intrusion detection section is formed by a first water intrusion detection electrode extending from the first electrode and a second water intrusion detection electrode extending from the second electrode being disposed with an interval narrower than an interval between the first electrode and the second electrode, and, in a case where water has intruded into the hollow member, the first electrode and the second electrode are electrically connected via the intruding water in the water intrusion detection section.

The touch sensor device according to another aspect of this disclosure includes a touch sensor unit having a tubular hollow member constituted by an elastically deformable insulator and first and second electrodes extending in a longitudinal direction of the hollow member and apart from each other in a state of being sealed on an inner side of the hollow member, in which the touch sensor unit is configured such that the first electrode and the second electrode are in contact with each other and electrically connected based on elastic deformation of the hollow member, the touch sensor device further includes a pressure member, the pressure member elastically deforms the hollow member and forms a narrow portion, at which the interval between the first electrode and the second electrode is narrowed, in the hollow member by being fitted to an outer periphery of the hollow member.

According to the aspect of this disclosure, it is possible to quickly detect water intrusion into the hollow member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A touch sensor device comprising:
    a touch sensor unit having a sealed tubular hollow member constituted by an elastically deformable insulator and having first and second sensing electrodes extending in a longitudinal direction of the hollow member and spaced apart from each other on an inner side of the hollow member, wherein
    the touch sensor unit is configured such that the first sensing electrode and the second sensing electrode contact and electrically connect with each other based on an elastic deformation of the hollow member,
    a water intrusion detection section is provided at a position located at a lower end portion of the touch sensor unit extending in a vertical direction and, in a case where water has intruded into the hollow member, the first sensing electrode and the second sensing electrode are electrically connected via the intruding water in the water intrusion detection section,
    the water intrusion detection section is formed by disposing a first water intrusion detection electrode extending from the first sensing electrode and a second water intrusion detection electrode extending from the second sensing electrode at the position located at the lower end portion of the touch sensor unit, and
    a first interval between the first water intrusion detection electrode and the second water intrusion detection electrode is narrower than a second interval between the first sensing electrode and the second sensing electrode.

2. The touch sensor device according to claim 1, wherein
    the touch sensor unit is provided with a spacer intervening between the first sensing electrode and the second sensing electrode and fitting into an opening end of the hollow member, and
    the first water intrusion detection electrode and the second water intrusion detection electrode are formed by fixing a pair of electrical connection members, to the spacer.

3. The touch sensor device according to claim 2, wherein
    the spacer is sandwiched between the pair of electrical connection members and functions as a resistor connected to the first sensing electrode and the second sensing electrode.

4. The touch sensor device according to claim 1, wherein
    each of the first sensing electrode and the second sensing electrode is formed by embedding a core wire into an elastically deformable electrical connection member which extends along the inner side of the hollow member.

5. The touch sensor device according to claim 1, wherein
    at least one of the first water intrusion detection electrode and the second water intrusion detection electrode is sloped so as to guide the intruding water in the water intrusion detection section to a position straddling the first water intrusion detection electrode and the second water intrusion detection electrode.

6. The touch sensor device according to claim 5, wherein
    the at least one of the first and second water intrusion detection electrodes is provided with a water repellent function.

7. The touch sensor device according to claim 1, further comprising:
    an electrical connection determination unit for determining an electrical connection state of the first sensing electrode and the second sensing electrode; and
    a water intrusion determination unit for determining whether the intruding water is present between the first and second sensing electrodes based on the electrical connection state, wherein
    the electrical connection determination unit detects a resistance value of a detection circuit including the first sensing electrode and the second sensing electrode, and
    the water intrusion determination unit determines that the intruding water is present between the first and second sensing electrodes when the resistance value is higher than a first electrical connection determination value and is equal to or less than a second electrical connection determination value.

8. The touch sensor device according to claim 1, further comprising:
    an electrical connection determination unit for determining an electrical connection state of the first sensing electrode and the second sensing electrode; and a water intrusion determination unit for determining whether the intruding water is present between the first and second sensing electrodes based on the electrical connection state, wherein the water intrusion determination unit determines that the intruding water is present between the first and second sensing electrodes when the first sensing electrode and the second sensing electrode are in a state of electrical connection beyond a predetermined water intrusion determination time.

9. A touch sensor device comprising:

a touch sensor unit having a sealed tubular hollow member constituted by an elastically deformable insulator and having first and second sensing electrodes extending in a longitudinal direction of the hollow member and spaced apart from each other inside the hollow member, wherein the touch sensor unit is configured such that the first sensing electrode and the second sensing electrode contact and electrically connect with each other based on an elastic deformation of the hollow member, a water intrusion detection section is provided inside the hollow member, the water intrusion detection section is formed by a first water intrusion detection electrode extending from the first sensing electrode and a second water intrusion detection electrode extending from the second sensing electrode, a first interval between the first water intrusion detection electrode and the second water intrusion detection electrode is narrower than a second interval between the first sensing electrode and the second sensing electrode, and wherein when water has intruded into the hollow member, the first water intrusion detection electrode and the second water intrusion detection electrode are electrically connected via the intruding water in the water intrusion detection section.

* * * * *